United States Patent Office 3,705,857
Patented Dec. 12, 1972

3,705,857
COMPOSITION AND METHOD FOR STRIPPING POLYVINYL BUTYRAL PRIMED COATINGS
Gail H. Clarke, Jr., Guilford, and Henry G. Barnowski, Jr., Durham, Conn., assignors to Olin Corporation
No Drawing. Filed Jan. 25, 1971, Ser. No. 109,701
Int. Cl. C09d 9/00; C11d 7/50; C23g 5/02
U.S. Cl. 252—170
7 Claims

ABSTRACT OF THE DISCLOSURE

A fast-acting stripping composition is employed to strip a variety of coatings, including polyurethane and polyepoxide coatings, from substrates which had been primed with polyvinyl butyral. The stripping composition comprises a mixture of a dialkyl ketone and a solvent selected from the group consisting of dimethyl formamide, tetrahydrofuran, and mixtures thereof.

---

This application relates to a composition and a method for the removal of coatings from substrates. More particularly, the invention relates to a fast-acting stripping composition and to a method of employing it in removing coatings from substrates which had been primed with a polyvinyl butyral primer.

Highly cross-linked, resinous coatings, such as polyurethanes and polyepoxides have been found to be of great utility in protecting various surfaces from the eroding effects of the atmosphere. They have thus been extensively used in numerous applications such as imparting rain and sand erosion resistance to a variety of surfaces including aircraft and aircraft radomes. Nevertheless, these well-adhered, tough coatings, in time and after prolonged exposure to the elements or to high impact, crack and gradually erode. When that happens they often must be stripped off to prepare the substrate for recoating.

A variety of stripping compositions have been known in the art for removing coatings and paints from a substrate. These include acidic, basic and organic solvent-type stripping compositions. The toxicity of the acidic and the basic compositions and their tendency to attack metallic substrates renders them generally undesirable.

In the art of solvent-type stripping compositions, a variety of solvents have been employed. Thus U.S. Pat. 3,179,609 discloses a composition for stripping paints, varnishes, gums and synthetic resins, which comprises polyethylene oxide, an evaporation retardant and a solvent such as dimethyl formamide or methyl ethyl ketone. U.S. Pat. 3,321,407 discloses a paint stripping composition comprising ethylene diamine and tetrahydrofuran. However, the utility of these and similar stripping compositions known in the art has been limited to the extent that they are time-consuming, ineffective in removing highly cross-linked resinous coatings, or require special application techniques or conditions.

Now, in accordance with this invention, a composition and a method have been discovered for relatively fast and easy stripping of highly adherent coatings from substrates which had been primed with a polyvinyl butyral primer. The composition of the invention comprises a mixture of a dialkyl ketone and a solvent selected from the group consisting of dimethyl formamide, tetrahydrofuran, and mixtures thereof. The method of the invention comprises applying the stripping composition to a coated surface which had been primed with a polyvinyl butyral primer, thereby causing the primer to swell, and then removing or stripping the primer and the coating.

Polyvinyl butyral is a universally known coating primer which can be purchased commercially. It is usually applied to a substrate as a solution, using a solvent such as ethylene glycol monoethylether acetate in varying concentrations, such as about 30% by weight. When used as a primer for curable, resinous coatings it is often mixed with a small proportion of phosphoric acid, the latter acting as a curing accelerator for the coating.

The dialkyl ketone utilized in the composition of the invention can be any ketone having the formula

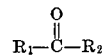

wherein $R_1$ and $R_2$ are, independently, alkyl radicals. Usually each of these alkyl radicals contains 1–10 carbon atoms. It is preferred, however, to employ those ketones in which each alkyl radical contains 1–4 carbon atoms. Illustrative of the preferred ketones are methyl ethyl ketone, methyl propyl ketone, methyl isopropyl ketone, methyl butyl ketone, methyl isobutyl ketone, diethyl ketone, ethyl butyl ketone, and so forth.

The dimethyl formamide and tetrahydrofuran which are employed in the composition of the invention are well-known chemicals which can be purchased commercially. They can be used in their commercially available state to prepare the stripping composition of the invention.

In preparing the stripping composition of the invention, a weight ratio of dimethyl formamide, tetrahydrofuran, or mixtures thereof, to dialkyl ketone ranging from about 8:92 to about 50:50, and preferably from about 10:90 to about 30:70, is employed. In the most preferred embodiment of the invention, this ratio ranges from about 12:88 to about 20:80.

In a preferred embodiment of the invention, the stripping composition also includes a ground filler. Illustrative fillers include, but are not limited to, kaolin, fuller's earth, calcium carbonate, Attapulgus clay, talc, fumed silica, and barytes. The advantage in using a filler in the stripping composition of the invention is two-fold. It thickens the composition, imparting thereto a trowelable, mud-like consistency for limited flow and improved contact with the coating and primer. It also makes for a more efficient utilization of the stripping composition by retarding its rate of evaporation.

The filler may be employed in any suitable proportion such as up to about 60%, and preferably about 25–45%, based on the total weight of the stripping composition.

Other additives may be incorporated into the stripping composition as the particular application may call for or require. For example, an emulsifier, such as an alkyl phenyl polyethylene glycol ether, a wetting agent, such as a substituted silicone, and/or a pigment, such as titanium dioxide, may be employed in suitable proportions.

The components of the stripping composition of the invention may be mixed or blended together manually, such as by using a paddle stirrer, or by any conventional blending means such as a magnetic stirrer or a mechanical agitator. Where a filler is employed, depending on its relative content, a high-shear mixer may be needed, such as a Cowles dissolver, to blend it into the stripping composition.

After mixing, the stripping composition of the invention is applied to the surface of a coating having a polyvinyl butyral primer. Any suitable method of applying the stripping composition of the invention to a coated surface can be employed such as dipping, spraying, brushing, troweling, spreading with a suitable instrument such as a putty knife, soaking with cloth, and so forth; and the term "applying," as used in the specification and claims herein, encompasses any such method.

Within a short time after application, the stripping composition penetrates the coating to the primer, causing the latter to swell and lift away from the substrate. Then the primer and coating can be easily stripped off, usually by peeling as a single, continuous sheet. The entire operation can be carried out at ambient conditions to obtain a clear-surface substrate, free of primer and coating, which is ready for immediate recoating.

In another embodiment of the invention, an impermeable sheet or film, such as a polyethylene film, may be laid over the coated surface immediately after the stripping composition has been applied thereto. Such a film can be employed where it is desired to further inhibit the evaporation of the stripping composition.

The stripping composition of the invention may be employed to strip the coating from any polyvinyl butyral-primed surface. It is non-basic and non-acidic and can be used in connection with coated metallic substrate without otherwise attacking or corroding such substrates. It is also of particular utility in removing coatings from resinous, laminated substrates such as epoxy-fiberglass laminates, polyester-fiberglass laminates, epoxy-boron fiber laminates, epoxy-carbon fiber laminates, and so forth. Thus it is particularly useful in stripping polyvinyl butyral-primer coatings from metallic or laminated aircraft surfaces, aircraft radomes, and various navigational equipment.

The stripping composition and method of the invention may be employed to remove a variety of coatings which had been applied to a polyvinyl butyral-primed substrate. They are effective in stripping resinous coatings including highly-adherent, cross-linked coatings such as polyurethanes and polyepoxides without scraping and without otherwise attacking the coating or the substrate.

The speed with which the stripping composition of the invention attacks the polyvinyl butyral primer is particularly surprising and highly desirable. Thus in from about 12 to about 60 minutes, and often within about 15–30 minutes, from the time of application of the stripping composition, the primer swells and can be lifted or peeled off, together with the coating, from the substrate. Within this short interval of time, the stripping composition does not attack either the coating or the substrate. Yet, surprisingly, it penetrates or permeates the coating and quickly causes the primer to swell and become readily peelable together with the coating. The substrate surface, after the swelled primer and coating are removed, will be completely clean, intact, and ready for recoating.

Another highly desirable aspect of the invention is that it enables easy and efficient spot-repairing of large coated surfaces such as radomes and navigational equipment. Thus formulated to a mud-like consistency by incorporating a filler therein, the stripping composition of the invention can be applied to only a limited area of the coated surface, i.e. the area which has commenced to crack or erode. This enables stripping the primer and coating from that limited area, leaving the rest of the coated surface intact. A new primer and coating, having the same thickness and composition as that of the unstripped coating, can then be applied to the stripped surface. The new coating, which has the same properties as the original coating, blends well with the adjacent unstripped coating. A simple and fast repairing operation can thus be accomplished without the need to strip off and recoat the entire coated surface.

The following examples are provided to illustrate the invention in stripping a moisture-cured, 12–13 mm. thick polyurethane coating from a variety of substrates. The coating, as applied to the substrate, comprises a solvent, such as xylene, and an isocyanate-terminated prepolymer which is the reaction product of toluene diisocyanate with polytetramethylene ether glycol, molecular weight 650, and about 1 part, per each 9 parts by weight of the glycol, of oxypropylated glycerin, molecular weight 600. In each case, this coating composition was applied to a substrate which had been primed with phosphoric acid-catalyzed polyvinyl butyral, and then it was allowed to become fully cured in an atmosphere having a relative humidity of about 50%.

EXAMPLE 1

A stripping composition was prepared from the following ingredients in the indicated proportions:

| Ingredients: | Parts by weight |
| --- | --- |
| Dimethyl formamide | 471 |
| Methyl ethyl ketone | 1,884 |
| Attapulgus clay | 1,645 |

The above ingredients were blended together at room temperature using a Cowles dissolver. A portion of the blend was then troweled to a substantially uniform thickness of about ⅛ of an inch over an aluminum airfoil-shaped test specimen coated with a polyurethane coating as described above. In about 10–14 minutes, the primer and coating began to blister, swell, and lift away from the aluminum substrate. After a total of about 25 minutes from the time of application of the stripping composition, the entire coating was loose. Together with the primer, it was easily peeled off the airfoil, leaving a clean, smooth metallic surface. The metal was examined for any signs of attack by the stripping composition: None were found.

Another portion of the blend was utilized in the same manner described above to strip a polyurethane coating from an epoxy-glass, 12″ square laminate. After about 16 minutes from the time of application of the stripping composition, the primer and coating began to swell and lift off the substrate, and after about 30 minutes, the coating and primer were easily peeled off the plate, leaving a few small primer spots. These were easily removed by rubbing with a piece of cloth. The coating-and-primer-free laminate surface was smooth and completely intact.

EXAMPLE 2

A stripping composition was prepared from the following ingredients in the indicated proportions:

| Ingredients: | Parts by weight |
| --- | --- |
| Tetrahydrofuran | 15 |
| Methyl ethyl ketone | 85 |
| Attapulgus clay | 70 |

The above ingredients were manually blended together, using a paddle, to a mud-like consistency. The blend was divided into three portions, A, B, and C, which were used to remove polyurethane coatings, as described above, from three different substrates. The substrate in the case of portion A was an aluminum airfoil-shaped specimen; in the case of portion B, the substrate was a polyester-glass fiber laminate; and in the case of portion C, it was an epoxy-fiberglass laminate. In each case, the stripping composition was spread over the coating with a spatula to a thickness of about 1/12 of an inch and then covered with a polyethylene sheet. Within about 20–25 minutes, the coating and primer were loose and could be easily stripped off the substrate. After stripping, each substrate was examined and found to be perfectly smooth and free of any signs of corrosion or attack by the stripping composition.

EXAMPLE 3

Immediately after stripping the primer and coating from each of the substrates for Example 2, the substrates were wiped with an acetone-soaked cloth and allowed to air-dry for 10–15 minutes. Then each substrate was re-coated with a polyvinyl butyral-primed polyurethane coating as described above. After curing, the coating, in the case of each substrate, was found to be highly adherent and had the same appearance and properties of the original polyurethane coating.

EXAMPLE 4

The identical procedure of Example 2 was followed using methyl isobutyl ketone, instead of the methyl ethyl ketone, and dimethyl formamide instead of the tetrahydrofuran. Swelling of the primer was observed to commence in about 15 minutes from the time of application of the stripping composition. After another 15 minutes, the coating and stripper were easily peeled off, leaving, in the case of each of the three substrates, a smooth surface which was completely intact.

EXAMPLE 5

The purpose of this example is to demonstrate the utility of the stripping composition of the invention in spot-repairing polyvinyl butyral-primed, coated surfaces.

A stripping composition, as described in Example 1, was spread over a small portion of the surface of an epoxy-fiberglass airfoil-shaped test specimen which had been coated with a polyvinyl butyral-primed polyurethane coating as described above. The stripping composition was applied to a thickness of 1/8 of an inch. In about 20 minutes, the coating and primer, in the area covered by the stripping composition, swelled and lifted from the substrate. It was thus easily peeled off as a single sheet. The exposed portion of the epoxy-fiberglass substrate was then wiped with an acetone-dampened cloth, allowed to air-dry for about 15 minutes and then re-covered by brushing with a new primer-polyurethane coating to the thickness of the original coating. The new coat blended well with the old one, and it exhibited excellent adhesion and no shrinkage.

What is claimed is:

1. A composition for stripping coatings which have been applied to a substrate primed with a polyvinyl butyral primer consisting essentially of a mixture of
    (a) a dialkyl ketone having the formula

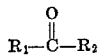

wherein $R_1$ and $R_2$ are, independently, alkyl radicals having 1–10 carbon atoms,
    (b) a solvent selected from the group consisting of dimethyl formamide, tetrahydrofuran, and mixtures thereof, the weight ratio of said dialkyl ketone to said solvent ranging from about 50:50 to about 92:8, and
    (c) from 0 to about 60%, based on the total weight of said composition, of a ground filler is selected from the group consisting of kaolin, fuller's earth, calcium carbonate, Attapulgus clay, talc, fumed silica and barytes.

2. The composition of claim 1 wherein each of said alkyl radicals has 1–4 carbon atoms.

3. The composition of claim 2 wherein said ratio ranges from about 70:30 to about 90:10.

4. The composition of claim 1 wherein said filler is Attapulgus clay.

5. The composition of claim 4 wherein said filler is present in a proportion range of about 25–45% based on the total weight of said composition.

6. The composition of claim 5 wherein said dialkyl ketone is methyl ethyl ketone or methyl isobutyl ketone.

7. The composition of claim 1 wherein said ratio ranges from about 80:20 to about 88:12.

References Cited

UNITED STATES PATENTS

| 2,850,461 | 9/1958 | Bloch et al. | 252—364 |
| 3,179,609 | 4/1965 | Morison | 252—DIG 8 |
| 3,475,218 | 10/1969 | Torrenzano et al. | 134—38 |
| 3,324,037 | 6/1967 | Rosenfeld | 134—38 |
| 3,429,823 | 2/1969 | Cataneo | 252—364 |

OTHER REFERENCES

Rose, The Cond. Chem. Dict., vol. 7 (1966), Reinhold Publ. Co., p. 90.

MAYER WEINBLATT, Primary Examiner

W. E. SCHULZ, Assistant Examiner

U.S. Cl. X.R.

134—38; 252—171 DIG 8